UNITED STATES PATENT OFFICE.

JAMES F. NEWMAN, OF GREENVILLE, FLORIDA.

COMPOSITION OF MATTER.

1,019,989.  Specification of Letters Patent.  Patented Mar. 12, 1912.

No Drawing.  Application filed June 7, 1911.  Serial No. 631,832.

*To all whom it may concern:*

Be it known that I, JAMES F. NEWMAN, a citizen of the United States, residing at Greenville, in the county of Madison and State of Florida, have invented certain new and useful Improvements in Composition of Matter, of which the following is a specification.

My invention relates to a new and improved composition of matter and may be employed with benefit for various uses and possesses the advantage of being a particularly efficient and desirable friction material to use in connection with the clutches and brakes of automobiles to increase the coefficient of friction between the parts without causing the parts to stick together when it is attempted to release them, as is the result when rosin, or rosin cut in alcohol, or similar compounds are used.

In the manufacture of my improved material I employ the following ingredients in substantially the proportions named; reckoned by bulk: burnt oyster shells eighty-five per cent.; sulfur five per cent.; cement five per cent. and chalk five per cent.

The materials are ground up into a fine powder and then intimately mixed. Where one of the friction surfaces with which my composition is to be used is leather I preferably mix with the composition neat's foot or other suitable oil to prevent the hardening of the leather by the absorption of the oil therefrom by the powder.

In the use of my composition it is placed between the friction surfaces, and as it is incombustible and has a high wearing quality it is excellent for its purpose since it greatly increases the coefficient of friction between the parts.

What I claim as new and desire to secure by Letters Patent is:

1. The herein described composition of matter consisting of burnt oyster shells, sulfur, cement and chalk in powdered form combined in substantially the proportions stated.

2. The herein described composition of matter consisting of burnt oyster shells, sulfur, cement and chalk in powdered form combined in substantially the proportions stated with sufficient oil added thereto to form a paste.

In testimony whereof I affix my signature in presence of two witnesses.

JAMES F. NEWMAN.

Witnesses:
 GEO. S. LIVINGSTON,
 FRANCIS M. PHELPS.